United States Patent Office 3,539,683
Patented Nov. 10, 1970

3,539,683
ORAL, PARENTERAL AND INHALATION-THERAPY WITH 3,11-DIOXO-4,17(20)-CIS-PREGNADIEN-21-OIC ACID, METHYL ESTER, 3-OXIME
Robert W. Jackson, Portage, and John C. Babcock, Kalamazoo, Mich., assignors to The Upjohn Company, Kalamazoo, Mich., a corporation of Delaware
No Drawing. Continuation-in-part of application Ser. No. 657,073, July 31, 1967. This application Sept. 26, 1968, Ser. No. 762,971
Int. Cl. A61k 17/00
U.S. Cl. 424—45
3 Claims

ABSTRACT OF THE DISCLOSURE

This invention relates to pharmaceutical compositions containing novel 3-oximes and more particularly those embraced by the formula

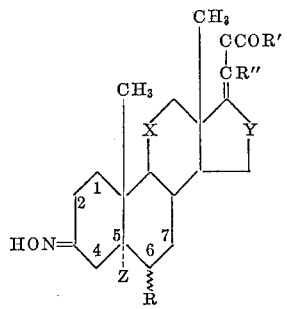

II wherein the 1(2)-, 4(5)- and 6(7)-carbon atom linkages are selected from the group consisting of single bonds and double bonds; ~ is generic expression denoting α- and β-bonds and mixtures thereof; X and Y are selected from the group consisting of the methylene radical

the α-hydroxymethylene radical

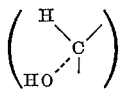

the β-hydroxymethylene radical

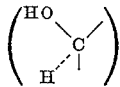

and the carbonyl radical

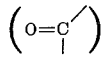

Z is selected from the group consisting of hydrogen and hydroxy, with the proviso that Z is absent when the 4(5)-carbon atom linkage is a double bond; R is selected from the group consisting of hydrogen, methyl and fluorine, with the proviso that when R is selected from the group consisting of methyl and fluorine, the stereoconfiguration at $C_6$ is β- when Z is hydroxy and selected from the group consisting of α- and β- when the 4(5)-carbon atom linkage is a double bond; R' is selected from the group consisting of hydrogen and lower alkyl of from one through twelve carbon atoms; R" is hydrogen and when Y is selected from the group consisting of the α-hydroxymethylene, β-hydroxymethylene and carbonyl radicals, R" is additionally methyl. It also provides methods for the treatment and administration of the foregoing compounds to mammals, including humans, in the treatment of anaphylactic reactions and delayed type sensitivities.

CROSS REFERENCE TO RELATED APPLICATIONS

This application is a continuation-in-part of application Ser. No. 657,073, filed July 31, 1967.

BRIEF SUMMARY OF THE INVENTION

The compounds embraced by Formula II, above, are prepared in accordance with the procedures described in application Ser. No. 657,073.

The compounds (II) employed in the compositions and methods of treatment of this invention occur in their 3-syn form, 3-anti form and as mixtures of these two isomers. Illustratively, the 3-oximes of 3,11-dioxo-4,17(20)-cis-pregnadien-21-oic acid, methyl ester (II) have the following configurations:

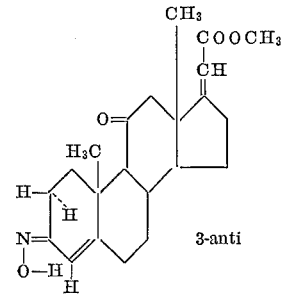

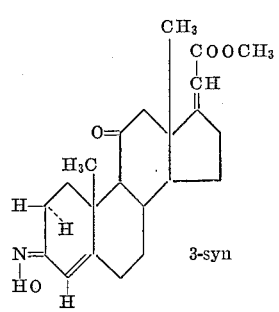

In this specification and claims, the term HON= when attached to the 3-carbon atom of the steroid nucleus denotes the 3-anti form, the 3-syn form and mixtures thereof.

In this application, unless specifically designated as cis or trans, the COOR' group attached to the double bonded C–20 carbon atom of the compounds of Formula II, above, includes both the cis and trans configuration and/or mixtures thereof.

The compounds embraced by Formula II possess anti-inflammatory, anti-viral, anti-microbial and anti-hormonal activities. They stimulate natural host-defense mechanisms to infectious diseases and virus induced processes. They antagonize the action of prostaglandins, bradykinin and Slow reacting Substance (SRS–A), which are released during anaphylaxis, and are consequently useful in protection against asthma, allergy, emphysema, anaphylaxis, hay fever, and in delayed type sensitivities such as ivy and insect bite poisoning, tuberculin reaction, sunburn, eczematoid dermatitis, itching skin and pruritis ani, as well as in the treatment of these ailments in mammals, including humans. The anti-SRS–A activity of the aforesaid compounds can be assayed by "The Protection of Sensitized Guinea Pigs Against Collapse From Antigen Containing Aerosol Test," a modification of the method described by W. G. Smith, J. Pharm. and Pharmacol. 13, 1 (1961). Their anti-bradykinin activity can be assayed by the method described by Roacha e Silva in Biochem. Pharmacol. 10, 3 (1962).

The compositions of the present invention are novel and useful pharmaceutical preparations demonstrating advantageous and beneficial results in the treatment of mammals afflicted with diseases resulting from inflammation, microbial and viral infection, and excess hormonal secretion. They stimulate natural host-defense mechanisms to infectious diseases and viral induced infections. They antagonize the action of prostaglandins, bradykinin and SRS–A, which are released during anaphylaxis, and are consequently useful in protection against asthma, allergy, emphysema, anaphylaxis, hay fever, and in delayed type sensitivities such as eczema, ivy and insect bite poisoning, tuberculin reaction, sunburn, eczematoid dermatitis, itching skin and pruritis ani, as well as in the treatment of these ailments.

The oral compositions of the present invention represented by Formula II are preferably presented for administration in unit dosage forms as tablets, pills, capsules, powders and granules. Elixirs, solutions or suspensions and similar liquid form are also satisfactory.

The compounds of Formula II can be administered parenterally; or by inhalation as a fog or mist provided by an aerosol spray.

For preparing solid compositions such as tablets, the principal active ingredient is mixed with conventional tableting ingredients such as corn starch, lactose, sucrose, sorbitol, talc, stearic acid, magnesium stearate, dicalcium phosphate, gums and functionally similar materials as pharmaceutical diluents or carriers. The tablets or pills of the novel compositions can be laminated or otherwise compounded to provide a dosage form affording the advantage of prolonged or delayed action or predetermined successive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like. A particularly advantageous enteric coating comprises a styrene maleic acid copolymer together with known materials contributing to the enteric properties of the coating.

The liquid forms in which the novel composition of the present invention may be incorporated for administration include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, methylcellulose, polyvinylpyrrolidone, gelatin and the like.

The term unit dosage form as used in the specification refers to physically discrete units suitable as unitary dosages for human and animal subjects, each unit containing a predetermined quantity of active material calculated to produce the desired therapeutic effect in association with the required pharmaceutical diluent, carrier or vehicle. The specifications for the novel unit dosage forms of this invention are dictated by and are directly dependent on (a) the unique characteristics of the active material and the particular therapeutic effect to be achieved, and (b) the limitations inherent in the art of compounding such an active material for therapeutic use in humans and animals, as disclosed in detail in this specification. Examples of suitable oral unit dosage forms in accordance with this invention are tablets, capsules, pills, powder packets, granules, wafers, cachets, teaspoonsful, droppersful, segregated multiples of any of the foregoing, and other forms as herein described.

For parenteral administration, fluid unit dosage forms of a compound of Formula II are prepared utilizing the compound and a sterile vehicle, water being preferred. The compound, depending on the form and concentration used, can be either suspended or dissolved in the vehicle. In preparing solutions the water-soluble compound can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum; the dry lyophilized powder is then sealed in the vial and an accompanying vial of water for injection is supplied to reconstitute the liquid prior to use. Parenteral suspensions are prepared in substantially the same manner except that the compound of Formula II is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The compositions of the present invention containing compounds of Formula II, when administered by inhalation as a fog or mist, are preferably self-propelling compositions comprising (1) the medicament of Formula II dissolved in (2) a non-toxic, liquefied propellant such as a fluorinated or fluorochlorinated lower saturated aliphatic hydrocarbon, and preferably a halogenated alkane containing not more than 2 carbon atoms and at least 1 fluorine atom or mixtures thereof, and (3) a co-solvent for both the medicament and propellant, if desirable or necessary. Examples of the propellants are dichlorofluoromethane, dichlorotetrafluoroethane, trichloromonofluoromethane, dichlromonfluoromethane, monochlorotrifluoromethane and mixtures of the foregoing.

The dosage of a compound of Formula II for treatment depends on the route of administration, age, weight, frequency of use, and condition of the patient. A total daily dose of from about 5 to 2000 mg. given singly or in divided doses, 1 to 6 times daily, embraces the effective range for the treatment of most conditions for which said compound is effective. The compound of Formula II is compounded with a suitable pharmaceutical carrier in unit dosage form for convenient and effective administration; in the preferred embodiment of this invention, the solid unit dosage forms contain a compound of Formula II in amounts from about 25 to about 500 mg. per unit; the fluid, fog and mits forms contain from about 0.1% to about 20% of a compound of Formula II. The dosage of compositions containing a compound of Formula II and, if desired, one or more other active ingredients is to be determined with reference to the usual dosage of each such ingredient.

Various other active ingredients can be included in the formulations of the present invention to provide a supplementary effect, which when employed in the treatment of certain conditions disclosed herein, enhance the usefulness of the compounds of Formula II. Advantageous combinations of activity and synergistic action can be obtained. Thus the compounds of Formula II can be effectively combined with anti-inflammatory agents such as $6\alpha$-methylprednisolone (0.5–20 mg.), hydrocortisone (5–

25 mg.), fluprednisolone (0.5–10 mg.), dexamethasone (0.1–2 mg.), prednisone or prednisolone (0.5–15 mg.), oxyphenbutazone (50–100 mg.); antihistamines such as chlorpheniramine maleate (2–12 mg.), chlorcyclizine hydrochloride (10–50 mg.), methdilazine hydrochloride (5–15 mg.) and cyproheptadine hydrochloride (5–15 mg.); antiasthmatics such as ephedrine hydrochloride (15–30 mg.), theophylline (100–250 mg.), methoxyphenamine (25–100 mg.), isoproterenol hydrochloride (5–10 mg.) and phenylpropanolamine hydrochloride (25–100 mg.).

The following examples are illustrative of the compositions and process of the present invention, but are not to be construed as limiting.

EXAMPLE 1.—TABLETS

One thousand tablets, each containing 500 mg. of 3,11-dioxo-4,17(20)-cis-pregnadien-21-oic acid, methyl ester, 3-oxime (II) are prepared from the following types and amounts of ingredients:

| | Gm. |
|---|---|
| 3,11 - dioxo - 4,17(20) - cis - pregnadien-21-oic acid, methyl ester, 3-oxime (II) | 500 |
| Lactose | 100 |
| Starch | 60 |
| Calcium stearate | 3 |
| Talc | 10 |

The finely powdered ingredients are mixed thoroughly and then tableted by a slugging procedure.

Tablets so prepared are useful in the treatment of asthma, allergy, emphysema, anaphylaxis, hay fever, and in delayed type sensitivities such as eczema, ivy and insect bit poisoning, tuberculin reaction, sunburn, eczematoid dermatitis, itching skin and pruritis ani in adult humans at a dose of 1 tablet taken 1 through 6 times daily.

Following the above procedure, tablets each containing 25, 50, 100, 250 and 350 mg. of 3,11-dioxo-4,17(20)-cis-pregnadien-21-oic acid, methyl ester, 3-oxime (II) are prepared by decreasing the amount of 3,11-dioxo-4,17(20)-cis-pregnadien-21-oic acid, methyl ester, 3-oxime (II) to 25, 50, 100, 250 and 350 gm.

EXAMPLE 2.—TABLETS

One thousand scored tablets, each containing 100 mg. of 3,11-dioxo-4,17(20)-cis pregnadien-21-oic acid, methyl ester, 3-oxime (II) and 2 mg. of methylprednisolone are prepared from the following types and amounts of ingredients:

| | Gm. |
|---|---|
| 3,11 - dioxo - 4,17(20) - cis - pregnadien - 21 - oic acid, methyl ester, 3-oxime (II) | 100 |
| Methylprednisolone | 2 |
| Lactose | 50 |
| Starch | 15 |
| Calcium stearate | 1 |
| Talc | 5 |

The finely powdered ingredients are mixed thoroughly and then tableted by a slugging procedure.

The tablets so prepared are useful in the treatment of asthma, allergy, emphysema, anaphylaxis, hay fever, and in delayed type sensitivities such as eczema, ivy and insect bite poisoning, tuberculin reaction, sunburn, eczematoid dermatitis, itching skin and pruritis ani in humans at a dose of half to 1 tablet 1 or 2 times daily.

Tablets can be similarly prepared containing coactive materials other than methylprednisolone. For example, tablets are similarly prepared following the above procedure and substituting for the methylprednisolone one of the following: chlorpheniramine maleate, 2 gm.; cyproheptadine hydrochloride, 2 gm.; methoxyphenamine hydrochloride, 50 gm.; and phenylpropanolamine hydrochloride, 25 gm.

EXAMPLE 3.—HARD-GELATIN CAPSULES

One thousand two-piece hard gelatin capsules, each containing 75 mg. of 3,11-dioxo-4,17(20)-cis-pregnadien-21-oic acid, methyl ester, 3-oxime (II) are prepared from the following types and amounts of ingredients:

| | Gm. |
|---|---|
| 3,11 - dioxo - 4,17(20) - cis - pregnadien - 21 - oic acid, methyl ester, 3-oxime (II) | 75 |
| Lactose | 50 |
| Magnesium stearate | 2 |
| Talc | 10 |

The finely powdered ingredients are mixed thoroughly and then encapsulated in the usual manner.

The capsules so prepared are useful in the treatment of humans afflicted with asthma, allergy, emphysema, anaphylaxis, hay fever, and in delayed type sensitivities such as eczema, ivy and insect bite poisoning, tuberculin reaction, sunburn, eczematoid dermatitis, itching skin and pruritis ani at a dosage of 1 capsule 3 times daily.

EXAMPLE 4.—SOFT-GELATIN CAPSULES

One-piece soft gelatin capsules for oral use, each containing 10 mg. of 3,11-dioxo-4,17(20)-cis-pregnadien-21-oic, acid, methyl ester, 3-oxime (II) are prepared by first dispersing the compound in corn oil to render the material capsulatable and then encapsulating in the usual manner.

The capsules so prepared are useful in the treatment of humans afflicted with asthma, allergy, emphysema, anaphylaxis, hay fever, and in delayed type sensitizations such as eczema, ivy and insect bite poisoning, tuberculin reaction, sunburn, eczematoid dermatitis, itching skin and pruritis ani at a dosage of 1 or 2 capsules taken 1 to 6 times daily.

EXAMPLE 5.—SYRUP

A syrup for oral administration containing 125 mg. of 3,11-dioxo-4,7(20)-cis-pregnadien - 21 - oic acid, methyl ester, 3-oxime (II) in each 5 ml. is prepared from the following types and amounts of ingredients:

| | Gm. |
|---|---|
| 3,11 - dioxo - 4,17(20) - cis pregnadien - 21 - oic acid, methyl ester, 3-oxime (II) | 25 |
| Ascorbic acid | 10 |
| Methylparaben | 0.75 |
| Propylparaben | 0.25 |
| Saccharin sodium | 1.25 |
| Cyclamate sodium | 0.25 |
| Glycerin, 300 ml. | |
| Tragacanth powder | 1 |
| Orange oil flavor | 5 |
| F.D. and C. orange dye | 0.75 |
| Deionized water q.s. ad, 1000 ml. | |

The syrup as prepared is useful in the treatment of humans suffering from asthma, allergy, emphysema, anaphylaxis, hay fever, and in delayed type sensitizations such as eczema, ivy and insect bite poisoning, tuberculin reaction, sunburn, eczematoid dermatitis, itching skin and pruritis ani at a dose of 1 or 2 teaspoonfuls taken 1 through 6 times daily.

EXAMPLE 6.—PARENTERAL SUSPENSION

A composition suitable for injection wherein each milliliter contains 50 milligrams of active ingredient is as follows:

| | Gm. |
|---|---|
| Sterile micronized 3,11-dioxo-4,17(20)-cis-pregnadien-21-oic acid, methyl ester, 3-oxime (II) | 5.0 |
| Polyethylene glycol 4000 | 3.0 |
| Sodium chloride U.S.P. | 0.9 |
| Polysorbate 80 U.S.P. | 0.4 |
| Benzyl alcohol N.F. | 0.9 |
| Water for injection q.s., 100 ml. | |

The polyethylene glycol, sodium chloride, polysorbate 80 and benzyl alcohol are dissolved in water and the solution sterilized by passage through a sterilizing filter. Sterile 3,11 - dioxo - 4,17(20) - cis - pregnadien - 21 - oic acid, methyl ester, 3-oxime (II) is then aseptically mixed with the sterile vehicle and the whole homogenized. The suspension is filled aseptically into sterile 2 milliliter ampules.

The contents of these ampules when injected intramuscularly once a day is useful in the treatment of humans having asthma, allergy, emphysema, anaphylaxis, hay fever, and in delayed type sensitizations such as eczema, ivy and insect bite poisoning, tuberculin reaction, sunburn, eczematoid dermatitis, and pruritis ani.

The novel compositions of the present invention represented by Formula II that are administered by inhalation as a fog or mist can be prepared and containers filled with them by the procedure that follows.

A suitable measured quantity of a medicament embraced by Formula II is mixed with, and dissolved in, a measured amount of co-solvent (e.g., ethanol, diethyl ether, etc.). A measured quantity of the resulting solution is then introduced into an open container, which is then cooled to a temperature below the boiling point of the non-toxic propellant to be employed, a temperature of about −32° C. being satisfactory. A measured quantity of the liquefied propellant (e.g., dichlorodifluoromethane, dichlorotetrafluoroethane, etc.), cooled below its boiling point, is then introduced into the container and mixed with the solution already present. The quantities of the components introduced into the container are calculated to provide the desired concentration of each in the final composition. Without permitting the temperature of the container and its contents to rise above the boiling point of the propellant, the container is sealed with a closure equipped with a suitable dispensing valve arrangement. Upon warming to room temperature, the contents of the container is mixed by agitation to insure complete solution of the medicament; the sealed container is then ready to dispense the composition and provide the medicament of Formula II in aerosol form.

It is desirable to enclose the compositions of Formula II in a pressure-tight container having a suitable outlet valve secured in an opening in the top wall of the container. Glass bottles can be substituted for metal containers, thereby making it possible to readily observe the amount of medicament remaining therein. The glass bottle can be coated with a clear plastic film as a safety measure. A dip-tube of suitable material can be connected with the opening containing the valve arrangement and extending to the bottom of the container, or an inverted system without a dip-tube can be employed. Upon opening the valve, the composition is expelled through the opening in the form of a fine stream to form an aerosol of the medicament of Formula II. To accomplish suitable aerosolization of the medicament, the opening is preferably constructed to provide a small orifice so as to expel a fine spray (e.g., a fog or mist) of the composition. The thus described container is typical of the class known as an "aerosol bomb."

The following examples illustrate compositions of Formula II for administration by inhalation of aerosols; the quantities of material are expressed in terms of percentages by weight of the total composition.

EXAMPLE 7.—AEROSOL

| | Percent |
|---|---|
| 3,11 - dioxo - 4,17(20) - cis - pregnadien - 21 - oic acid, methyl ester, 3-oxime (II) | 0.25 |
| Ethanol (absolute) | 34.75 |
| Dichlorodifluoromethane | 65.00 |

EXAMPLE 8.—AEROSOL

| | Percent |
|---|---|
| 3,11 - dioxo - 4,17(20) - cis - pregnadien - 21 - oic acid, methy lester, 3-oxime (II) | 15 |
| Ethanol (95%) | 26 |
| Dichlorodifluoromethane | 59 |

EXAMPLE 9.—AEROSOL

| | Percent |
|---|---|
| 3,11 - dioxo - 4,17(20) - cis - pregnadien - 21 - oic acid, methyl ester, 3-oxime (II) | 5 |
| Ethanol (absolute) | 13 |
| Chloroform | 17 |
| Dichlorodifluoromethane | 35 |

The aerosols of Examples 7, 8, and 9 when employed as a nasal or oral spray are useful in the treatment of asthma, allergy, emphysema, anaphylaxis, hay fever, and in delayed type sensitizations such as eczema, ivy and insect bite poisoning, tuberculin reaction, sunburn, eczematoid dermatitis, itching skin and pruritis ani.

The procedures described above in Examples 1 through 9 for the preparation of compositions of 3,11 - dioxo-4,17(20) - cis - pregnadien - 21 - oic acid, methyl ester, 3-oxime (II), can also be employed in the production of medicaments wherein the active ingredient is another compound embraced by Formula II, e.g., 5α - hydroxy-6β - methyl - 3,11 - dioxo - 5α - pregn-cis - 17(20)-en - 21 - oic acid, methyl ester, 3-oxime (II), 6β - fluoro-5α,16α - dihydroxy - 3,11 - dioxo - 5α - pregn - cis - 17 (20) - en - 21 - oic acid, methyl ester, 3-oxime (II), 5α,16α - dihydroxy - 6β - methyl - 3,11 - dioxo - 5α-pregn - cis - 17(20) - en - 21 - oic acid, methyl ester, 3-oxime (II), 5α,16β - dihydroxy - 6β - methyl - 3,11-dioxo - 5α - pregn - cis - 17(20) - ene - 20 carboxylic acid, methyl ester, 3-oxime (II), 6α - methyl - 3,11 - dioxo-cis - 4,17(20) - pregnadien - 21 - oic acid, methyl ester, 3-oxime (II) and 11β - hydroxy - 4,17(20) - cis - pregnadien - 3 - one - 21 - oic acid, methyl ester, 3-oxime (II).

While the treatment of asthma, allergy, emphysema, anaphylaxis, hay fever, and in delayed type sensitizations such as eczema, ivy and insect bite poisoning, tuberculin reaction, sunburn, eczematoid dermatitis, itching skin and pruritis ani disclosed following Examples 1 through 9 utilizes 3,11 - dioxo - 4,17(20) - cis - pregnadien - 21 - oic acid, methyl ester, 3-oxime (II), similarly effective therapy is provided with comparable dosages by employing medicaments wherein the active ingredient is another compound embraced by Formula II, e.g., 5α - hydroxy-6β-methyl - 3,11 - dioxo - 5α - pregn - cis - 17(20)-en-21-oic acid, methyl ester, 3-oxime (II), 6β - fluoro - 5α,16α-dihydroxy - 3,11 - dioxo - 5α - pregn - cis - 17(20)-en-21-oic acid, methyl ester, 3-oxime (II), 5α,16α - dihydroxy - 6β - methyl - 3,11 - dioxo - 5α - pregn-cis-17(20)-en - 21 - oic acid, methyl ester, 3-oxime (II), 5α,16β-dihydroxy - 6β - methyl - 3,11 - dioxo - 5α - pregn-cis-17(20) - ene - 20 - carboxylic acid, methyl ester, 3-oxime (II), 6α - methyl - 3,11 - dioxo - cis - 4,17(20) - pregnadien-21-oic acid, methyl ester, 3-oxime (II) and 11β-hydroxy - 4,17(20) - cis - pregnadien - 3 - one - 21 - oic acid, methyl ester, 3-oxime (II).

We claim:

1. A therapeutic composition comprising, in dosage unit form, an oral, parenteral, or inhalation pharmaceutical vehicle carrier having, as the essential active ingredient 3,11 - dioxo - 4,17(20) - cis - pregnadien - 21 - oic acid, methyl ester, 3-oxime.

2. A composition in accordance with claim 1 wherein the inhalation pharmaceutical carrier comprises a nontoxic liquefied propellant, and a co-solvent for the aforesaid propellant.

3. A method of treating a mammal afflicted with asthma, allergy, emphysema, anaphylaxis, hay fever, eczema, ivy poisoning, insect bite poisoning, tuberculin reaction, sunburn, eczematoid dermatitis, itching skin, or pruritis ani, which comprises administering thereto, orally, parenterally or by inhalation, an effective amount of 3,11-dioxo - 4,17(20) - cis - pregnadien - 21 - oic acid, methyl ester, 3-oxime.

(References on following page)

References Cited

UNITED STATES PATENTS

| | | | |
|---|---|---|---|
| 2,153,700 | 4/1939 | Serini et al. | 260—397 |
| 3,169,132 | 2/1965 | Birkenmeyer et al. | 260—397.3 |
| 3,281,415 | 10/1966 | Schneider et al. | 260—239.55 |
| 3,305,546 | 2/1967 | Pike | 260—239.55 |

FOREIGN PATENTS 6,614,662  4/1967  Netherlands.

SHEP K. ROSE, Primary Examiner

U.S. Cl. X.R.

414—238, 242, 243